Sept. 21, 1943.  E. A. CAMBURN  2,329,823
STEERABLE CASTER TYPE TAIL WHEEL
Filed March 25, 1940  2 Sheets-Sheet 1

Inventor
ELWYN A. CAMBURN
By Beaman & Langford
Attorneys

Sept. 21, 1943.   E. A. CAMBURN   2,329,823
STEERABLE CASTER TYPE TAIL WHEEL
Filed March 25, 1940   2 Sheets-Sheet 2

Inventor
ELWYN A. CAMBURN
By Beaman & Langford
Attorneys

Patented Sept. 21, 1943

2,329,823

UNITED STATES PATENT OFFICE 2,329,823

STEERABLE CASTER TYPE TAIL WHEEL

Elwyn A. Camburn, Jackson, Mich., assignor to Lake State Products, Inc., Jackson, Mich., a corporation of Michigan Application March 25, 1940, Serial No. 325,762

6 Claims. (Cl. 244—50)

The present invention relates to improvements in tail wheels for airplanes of a steerable type actuated preferably in coordination with the rudder mechanism.

More specifically the invention has reference to tail wheels which are steerable through a substantial arc yet have full swivel or caster action. Such devices heretofore proposed have not possessed the positive coupling relation between the steering mechanism and the tail wheel as provided by the present invention within the steering arc.

Thus it is one of the objects of the present invention to provide a tail wheel steering coupling for airplanes which provide a positive connection between the steering mechanism within the steering arc.

Another object is to provide a full caster steerable tail wheel in which there is no load or resistance to overcome in uncoupling the tail wheel from the steering mechanism.

Other objects and advantages reside in the construction, arrangement, and combination of parts hereinafter set forth in the specification and claims.

In the form of the invention illustrated in the accompanying drawings.

Figure 1:
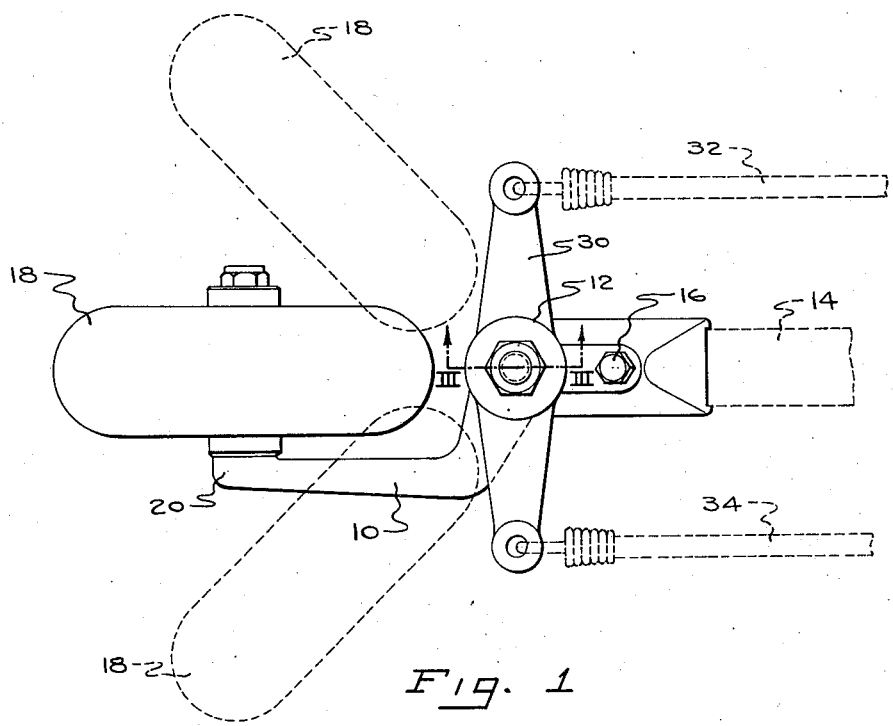
Fig. 1 is a plan view of the tail wheel assembly.
Figure 2:
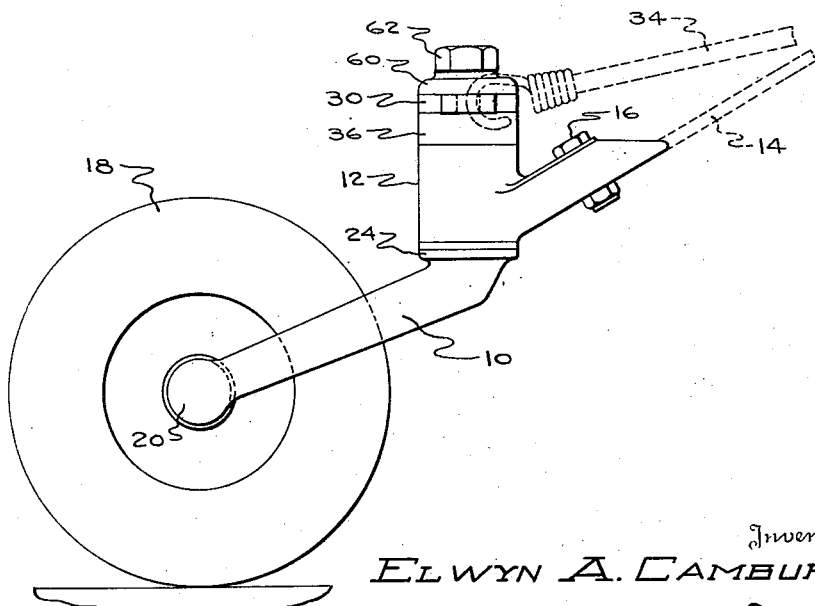
Fig. 2 is a side elevational view of Fig. 1.
Figure 3:
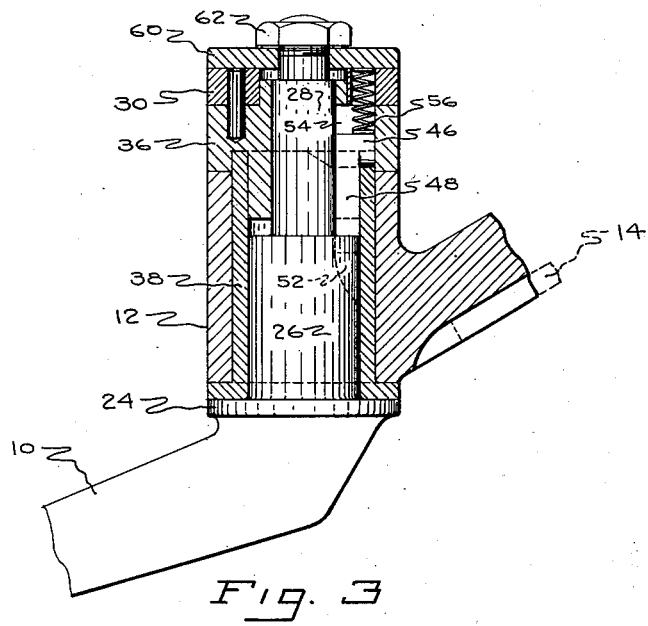
Fig. 3 is a cross-sectional view taken on line III—III of Fig. 1.
Figure 5:
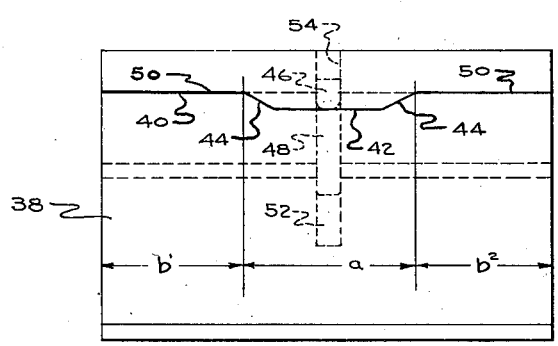
Fig. 5 is a development of the operating cam and key way.
Figure 4:
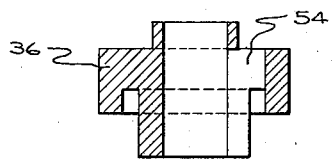
Fig. 4 is a cross-sectional view of the hub part shown separately.

Referring to the drawings, the tail wheel assembly 10, comprising a fixed housing 12, secured to the tail skid part 14 by a bolt 16. The wheel 18 is mounted for rotation upon an axle 20 which may be an integral part of the angular arm 22 having as an integral part thereof the vertical post 24 with portions 26 and 28 of different diameters. The steering arm assembly comprises a double ended arm 30, to the ends of which shock cords 32 and 34 connect for gearing the arm 30 from the rudder actuating mechanism in a known manner. As more clearly shown in Figs. 3 and 4, the arm 30 is fixed to a hub-like part 36 by being pinned or otherwise secured together. In Fig. 4 the part 36 is shown by itself for clarity. A cam sleeve 38 is press fitted and then pinned in position within the housing 12. In Fig. 5 is a development of the sleeve 38 in full line to show the shape of the cam position 40 defined by the upper edge of the sleeve 38 with the associated part in dotted outline development. The lower horizontal portion 42 and the lift portions 44 define the track for the nose 46 of the key 48 with the wheel 18 swinging within the steering arc, while the portion 50 defines the track for the nose 46 with the wheel 18 castering or swiveling outside of the steering arc. The distance $a$ represents the steering arc while the combined distance $b^1$ and $b^2$ represent the free castering arc, as will be more fully described hereinafter.

A keyway 52 is machined in the cylindrical portion 26 of the part 24 in which the lower end of the key 48 is vertically slidable. A complementary keyway 54 is also machined in the hub 36 for slidably receiving the upper end of the key 48. A spring 56 urges the nose 46 of the key 48 into engagement with the cam 40. The arm 30 has an opening 58 for receiving the upper end of the spring 56 while the spring is held in position by a cap 60 which is held in position by the nut 62 engaging with the threaded end of the part 24. A cotter key or other suitable device (not shown) may be used to compel the nut 62 to turn with the part 24 as a unit.

To understand the operation of the above described construction it is well to keep in mind the fact that the post 24 is supported for complete rotation in the housing 12; that the cam sleeve is fixed to the housing 12; that the hub 36 is fixed to the steering arm 30 and is oscillated therewith as a unit; that the key 48 constitutes the sole coupling element between the post 24 and the steering arm assembly unit, the latter including the hub 36.

In operation, at the time the airplane takes off or lands the tail wheel will swing the post 24 into a position aligning the key 48 with the keyway 52 provided the rudder is in a neutral position. This alignment enables the key 48 to drop urged by the spring 56 into the keyway 52 positively locking or coupling the hub 36 and attached steering arm 30 to the post 24. With the tail wheel and rudder in the position just described the nose 46 of the key 48 will be riding on the portion 42 of the cam 40 defined by the upper edge of the sleeve 38. With the parts in their described relation, movement of the arm 30 accomplished by corresponding rudder movement, will enable the tail wheel to be positively steered within an arc corresponding to the arc of the cam portion 42 and that portion of the lifting portion 44 required to lift the key 48 sufficiently to clear the keyway 52. With the nose 46 of the key 48 riding on the portion 50 of the cam 40, the post 24 is uncoupled from the steering arm 30 so that there is no interference with the full swivel or caster action of the tail wheel 18.

It will be readily appreciated that the uncoupling and coupling of the tail wheel from and to the steering mechanism is fully automatic requiring no attention by the operator and is accomplished without addition of any appreciable resistance to swivel movement or use of an overload release.

In practice the cam 40 may be designed to give steering control over the tail wheel through a 90° arc with free swivel action through the remaining 270° arc.

Having described my invention, what I desire to secure by Letters Patent and claim is:

1. In a steerable full caster tail wheel assembly, the combination of a completely rotatable part about the axis of which the tail wheel swings, an oscillated part adapted to be oscillated by the steering mechanism, means supporting said oscillated part against relative axial movement, means supported in said rotatable part for vertical movement for locking the said parts together for rotation as a unit, and a cam plate surrounding said rotatable part co-acting with said first means to move the same to a non-locked position upon predetermined rotation of said first part.

2. In a steerable full caster tail wheel assembly, the combination of a completely rotatable part about the axis of which the tail wheel swings, a steering part having an axis of rotation common to said first part, alignable shoulder portions defined by said parts, a projectable part movable into locking position with said shoulder portions when in alignment to lock said parts together, and a continuous cam surrounding said rotatable part for moving said projectable part into and out of locking position upon predetermined rotation of said first part.

3. In a steerable full caster tail wheel assembly, the combination of a completely rotatable part supporting the tail wheel and about the axis of which the tail wheel swings, a steering part having an axis of rotation common to said first part, alignable keyways defined in said parts, a locking key carried in one of said keyways and projectable into the other with said keyways aligned, a cam for moving said key in one direction, means for projecting and withdrawing the said key, including a continuous cam surface surrounding said rotatable part, said cam being fixed relative to said first part whereby the projection and withdrawal of said key is controlled by predetermined rotation of said first part.

4. In a steerable full caster tail wheel assembly, the combination with a wheel supporting bracket, having a vertical post for swivel movement of the wheel, a fixed housing in which said post is supported for complete rotation, a steering part supported for rotation in said housing and having an axis of rotation common to the axis of rotation of said post, aligned keyways in said post and steering part, means defining a fixed cam track in said housing, a key carried in the keyway of one of said rotatable parts and engaging with the said cam track, said key upon rotation relative to said cam track being moved into and out of said other keyway to lock said steering part to said post during a portion of the swivel movement of the tail wheel about the axis of said post, and to unlock said steering part from said post during the remaining portion of the swinging movement.

5. A compact self-contained steerable full caster tail wheel assembly comprising a fixed housing, a vertical rotatable post supported for complete rotation within said housing and about the axis of which the wheel swivels, a partially rotatable steering part supported for rotation about an axis common to said post, means supporting said rotatable steering part against relative axial movement, clutch means supported in one of said rotatable parts for vertical movement and movable into the path of rotation of the other to partially rotate said parts as a unit, and declutching means located in said housing and engaging said first means upon predetermined partial rotation to free said post for full caster action.

6. A tail wheel assembly as set forth in claim 5 wherein said declutching means takes the form of a cam located in said housing and concentric with the axis of rotation of said post.

ELWYN A. CAMBURN.